United States Patent Office 3,465,916
Patented Sept. 9, 1969

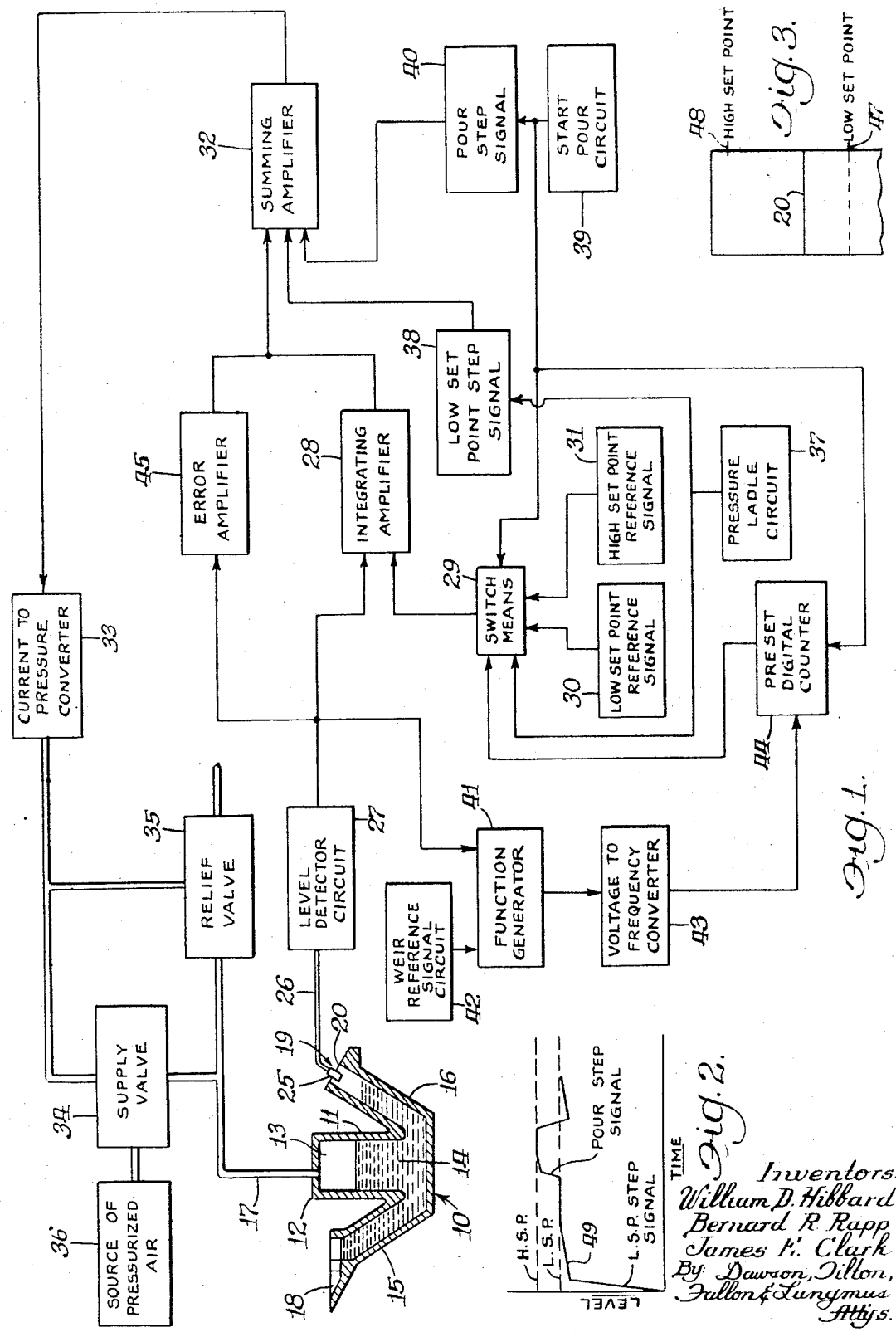

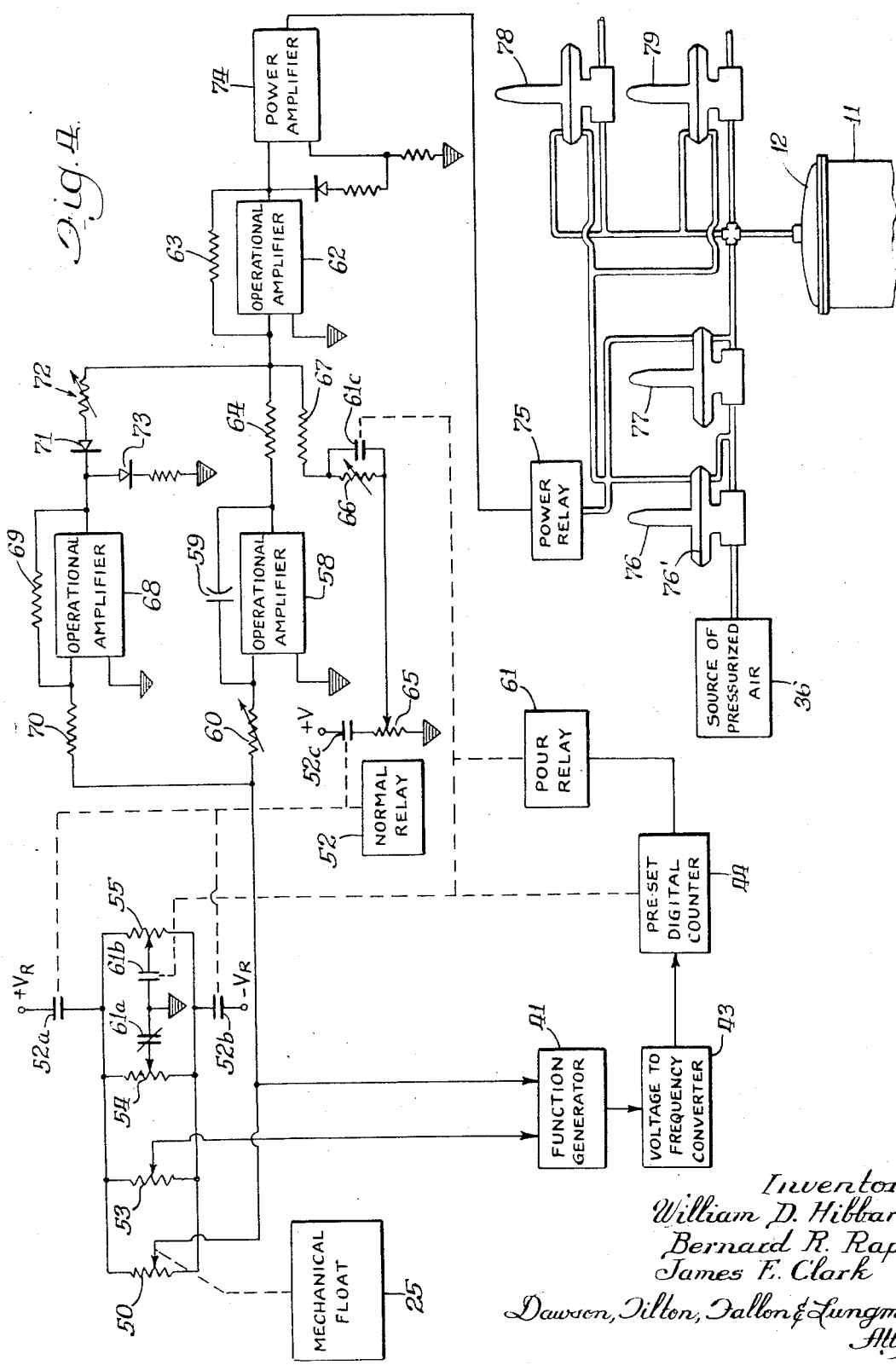

3,465,916
METHOD AND SYSTEM FOR POURING LIQUID METAL BY MEASURED VOLUME
William D. Hibbard, Wauwatosa, James E. Clark, Menomonee Falls, and Bernard R. Rapp, Port Washington, Wis., assignors to Modern Equipment Company, Port Washington, Wis., a corporation of Wisconsin
Filed Feb. 23, 1968, Ser. No. 707,673
Int. Cl. B67d 5/08
U.S. Cl. 222—70                14 Claims

ABSTRACT OF THE DISCLOSURE

The liquid to be poured is contained in an interior chamber of a sealed ladle. Gas under pressure is introduced into the chamber to displace the liquid and force it over a weir in a discharge spout communicating with the bottom of the ladle. A level detector generates an electrical signal representative of the liquid level in the spout. This signal is fed to an integrating amplifier having a rate of change of output signal which is a function of the difference between the level signal and a reference signal. To bring this system to an operative state, a first electrical step signal is introduced into the control loop for abruptly increasing the pressure in the ladle and the reference signal of the integrating amplifier is a first signal for maintaining the liquid at a constant level below the weir. When it is desired to pour, a second step signal is introduced into the control loop for generating a second abrupt increase in ladle pressure to force the liquid over the weir; and at the same time, the reference signal of the integrating amplifier is switched to a second signal for maintaining the liquid at a constant level above the weir thereby insuring a constant flow rate during pouring. A function generator receives the level signal and generates a signal representative of the actual pouring rate. This rate signal, in turn, feeds a voltage-to-frequency converter having an instantaneous frequency representative of the liquid flow rate. A preset digital counter receives this converter output signal; and when the preset count (indicative of a desired volume) is reached, it switches the reference signal input to the integrating amplifier to the first signal level thereby causing the liquid level in the spout to fall below the weir and terminate the pour.

BACKGROUND

The present invention relates to an improved system for pouring molten metal. Although systems exists for pouring molten metal by introducing air pressure at the top of a closed container to displace the liquid from the container and channel it into a mold, prior pouring systems have been controlled principally by pneumatic means; and they have been limited to relatively long cycle times (that is, the time between successive pours) in order to maintain stable operation.

One such prior system is described in the co-owned U.S. Patent No. 3,058,180 issued Oct. 16, 1962 to Port et al. The pneumatic control system of this patent had inherent limitations on the cycle time which were characterized by an oscillation or "hunting" of the liquid level in the spout about the high and low set points at the faster cycle times. It has been found that a pneumatic control system cannot achieve the desired degree of variation in cycle time without also introducing this instability in the liquid level. It will be appreciated that the volume of a pour cannot be accurately measured when the liquid level oscillates, and that a wide variation in volume may occur.

This known system generates a pressure representative of the liquid level in the spout for regulating the liquid level. When it is desired to pour, a controller switches a reference pressure to a higher pressure indicative of a high set point and a timing device is energized. When this timing device runs out, it switches the reference pressure back to the lower pressure thereby terminating the pour.

Because of the inertia of the liquid in the spout, the expansion of the gases within the chamber due to heating by the molten metal, the compressibility of the gas and the high density, it has not been feasible to maintain a stable liquid level at the shorter cycle times with a pneumatic control system. The unstable flow rates at the faster settings caused inconsistencies in the volume measurements, and since an accurate pour is of paramount importance, the cycle time was lengthened to achieve the required stability.

A further disadvantage of this prior system in seeking faster response times was the fact that the liquid level was brought up to the set point in the spout according to the relatively slow response characteristic of the pneumatic controller.

SUMMARY

In the instant invention, a level detector generates an electrical signal representative of the height of the liquid in the spout; and this signal is fed into an integrating amplifier. The integrating amplifier also receives a reference signal which, as described within, is either a low set point reference signal (when the system is in a normal condition and not pouring) or a high set point reference signal (during a pour). The rate of change of the output signal of the integrating amplifier is a function of the difference between its two input signals. Hence, if the signal indicating the liquid level (hereinafter referred to as the liquid level signal) is different than the low set point reference signal during normal operation, a corresponding pressure change will be called for, and the liquid level will be regulated about the low set point in the spout which is beneath the lip of the weir.

After sufficient molten metal has been introduced into the ladle to seal the chamber and provide a first pour, the electrical control system is energized and a first electrical step signal is generated in the control loop calling for an abrupt increase of pressure in the chamber to bring the liquid level in the spout to a level near the low set point in a very short time. The liquid level is raised the remaining distance to the low set point according to the response characteristics of the integrating amplifier.

When it is desired to initiate a pour, a second electrical step signal is generated in the control loop which calls for an abrupt increase in pressure. This rapid increase in pressure quickly brings the liquid level in the spout over the lip of the weir and up to a point near the high set point. At the same time, the reference input to the integrating amplifier is switched to a high set point reference signal so that the liquid level signal is compared against this high set point reference signal, and the liquid level is brought up to the high set point by the integrating amplifier and regulated about it for the entire pour.

The use of step signals to abruptly bring the system to a state of readiness and to abruptly initiate a pour has greatly enhanced its speed of response without the instability that has characterized prior pneumatic systems. That is to say the response characteristic of the integrating amplifier is not affected by the generation of the step signals; and, thus, the response characteristic can be set independently of the step signal to achieve the required degree of stability while substantially decreasing the cycle time.

The liquid level signal is also fed to a function generator which is referenced against a signal representative of the height of the weir lip and generates an output signal indicative of the flow rate of the liquid for the particular weir used. The output signal of the function generator is fed to a voltage-to-frequency converter which, in turn, triggers a preset digital counter. The digital counter integrates or sums the flow rate signal over the entire pour period; and it thus contains a signal representative of the pour volume. When the digital counter reaches a predetermined count indicating a predetermined volume for the pour, it generates a signal which switches the reference signal input of the integrating amplifier back to the low set point reference signal, and the control system thereupon calls for a reduced pressure thereby reducing the level of the liquid in the spout and terminating the pour.

By thus introducing the electrical step signal into the control system when initiating a pour, the cycle time between pours is significantly reduced without loss of stability since the liquid level is almost immediately brought up to a level near the high set point. Further, since most of the control functions, logic as well as computation, are performed by means of electrical signals, as distinguished from prior pneumatic signals, the respones time for the control portion of the system is instantaneous when compared with the pouring time, and, therefore, the control system is able to respond much faster to changes in the liquid level, etc., and a greater accuracy is thereby achieved.

In addition to the above advantage, the present system is able to measure directly and instantaneously the pouring rate which, when accumulated in the digital counter, determines directly the volume of the pour. The pouring time can be adjusted by a simple and independent adjustment of the high set point reference signal. Thus, the cycle time as well as the pour time can further be reduced by direct setting.

Further, an arrangement of exhaust valves associated with the pressurized chamber allows the gas to be expelled through one valve if the liquid level signal is higher than the reference signal received by the integrating amplifier; but if this difference exceeds a predetermined margin, a second, larger exhaust valve is opened to greatly increase the exhausting of the gas.

There is also provided an error amplifier circuit which receives the liquid level signal and generates an error signal representative of the height of the liquid level above which ever set point is providing the reference.

The error signal may be made relatively large compared to the output signal of the integrating amplifier so that it overrides this latter signal under certain circumstances in compensating for the inertia of the liquid and the rapid expansion of gases within the chamber.

Other advantages and features of the instant invention will be obvious to persons skilled in the art from the following detailed description of a preferred embodiment accompanied by the attached drawing wherein identical reference numerals refer to like elements throughout.

THE DRAWING

FIG. 1 is a functional block diagram of a control system incorporating the present invention;

FIG. 2 is an idealized plot of liquid level within the spout as a function of time illustrating certain features of the invention;

FIG. 3 is a diagrammatic section view of the weir indicating the high set point and the low set point relative to the lip of the weir; and FIG. 4 is a more detailed circuit schematic partially in functional block form, of the system of FIG. 1.

DETAILED DESCRIPTION

Although the instant invention may be used for pouring predetermined amounts of any liquid, it will be described in connection with a system for pouring molten metal which is the preferred use. Further, many of the individual elements used in the system are well known in the electronic control art, and these will not be described in greater detail than is necessary for an understanding of their individual function and the overall operation of the system.

Turning first to FIG. 1, the container for the liquid metal is generally designated by reference numeral 10; and it is seen to comprise a ladle 11, a dome 12 sealed to the top of the ladle 11 and defining an interior chamber 13 above the molten metal which is generally designated 14. The ladle 11 further includes an input or filling spout 15 and a discharge or pouring spout 16. The channels defined by the spouts 15 and 16 communicate with the lower portion of the ladle 11. An inlet air or gas line 17 extends through the dome 12 for allowing pressurized gas to enter the chamber 13. The top of the inlet spout 15 defines an enlarged receptacle 18 for receiving molten metal from a furnace or the like.

The discharge spout 16 is provided with a weir, as at 19 including a lip 20 which defines the highest point to which the liquid may rise in the discharge spout 16 without actually pouring over. After passing over the lip 20, the molten metal is directed into a mold (not shown). Further structural details of the ladle and its associated apparatus may be obtained from the above-identified patent.

Carried within the upper portion of the discharge spout 16 is a ceramic float 25 designed to float on the surface of the molten metal in the spout 16 and capable of withstanding intense heat. The float 25 is coupled by means of an arm 26 to a level detector circuit 27. The level detector circuit 27 generates an electrical signal representative of the height of the liquid in the discharge spout 16.

The output of the level detector circuit 27 is fed to the signal input of an integrating amplifier 28. The reference input of the integrating amplifier 28 is received through switch means 29 from either a low set point reference signal 30 or a high set point reference signal 31. The integrating amplifier 28 generates an output signal having a rate of change which is representative of the difference between the signal received from the level detector circuit 27 and the reference signal received from switch means 29; and its operation is considered an important aspect of the present invention for reasons more fully explained below. The output of the integrating amplifier 28 is coupled to the input of a summing amplifier 32 which energizes a current-to-pressure converter 33.

The current-to-pressure converter 33 converts the electrical signal received from the summing amplifier 32 into a corresponding pneumatic pressure signal. This pneumatic pressure signal is fed to a supply valve 34 and to a relief valve 35. A source of pressurized air 36 is coupled through the supply valve 34 if the pressure generated by the converter 33 is greater than the pressure in the chamber 13. If the pressure in the chamber 13 is greater than the pressure generated by the converter 33, relief valve 35 is opened to exhaust the gas within the chamber to the atmosphere thereby relieving the pressure within the chamber.

A start, or "pressurized ladle" circuit 37 is coupled to a control input of the switch means 29 and also to a low set point step signal generator 38. The output of the low set point step signal generator 38 is also fed to an input of the summing amplifier 32. A "start pour" circuit 39 is also coupled to a control lead of the switch means 29 to control it in a manner to be described presently. The output of the start pour circuit 39 also energizes a pour step signal 40 which, in turn, is connected to the input of the summing amplifier 32.

The output of the level detector circuit 27 is connected to the signal input of a function generator 41, the reference input of which is received from a weir reference signal circuit 42. The output of the function generator 41 drives a voltage-to-frequency converter 43; and the output of the voltage-to-frequency converter 43 drives the input of a preset digital counter 44. The output of preset digital counter 44 is coupled to a control input of the switch means 29, and it is reset by the start pour circuit 39.

An error amplifier 45 also receives the output of the level detector circuit 27, and its output is connected to the input of the summing amplifier 32 with the output of the integrating amplifier 28. The function of the error amplifier 45, as will be made clear below is to override the integrating amplifier 28 under certain circumstances. For example, at the end of a pour it is desired to abruptly call for pressure decrease, but the integrating nature of amplifier 28 will cause delay. In this case the error amplifier 45 generates a relatively large signal calling for reduced pressure. This error signal may also provide compensation for the inertia of the metal and rapidly expanding gases.

In our preferred embodiment, we use a weir having a rectangular transverse section as schematically illustrated in FIG. 3 wherein the lip 20 is seen to be above the low set point 47, and at the same time beneath the high set point 48.

OPERATION

When sufficient molten metal has been introduced into the input spout 15 to seal the bases of the input spout 15 and the discharge spout 16 respectively and to pour one casting, the system may be brought to a state of readiness by sealing the dome 12 with the body 11 and energizing the control system, as is known. When the pressure ladle circuit 37 is actuated, the switch means 29 is set to couple the output of the low set point reference signal 30 to the reference signal input of the integrating amplifier 28 and simultaneously energize the low set point step signal generator 38 to generate a step signal at the input of the summing amplifier 32 which will cause its output to change instantaneously thereupon calling for a pressure output from the current-to-pressure converter 33. This is illustrated by the steep slope of the line labeled "L.S.P. Step Signal" in FIG. 2, certain aspects of which are exaggerated for purposes of illustration.

Since the pressure within the chamber is at atmospheric pressure, the supply valve 34 will be opened to admit pressurized gas from the source 36 into the chamber 13 with displaces the liquid within the body 11 and raises the liquid level within the discharge spout 16. However, the liquid level will be below the low set point within the discharge spout 16, and it will rise to the low set point (L.S.P.) as illustrated by the line 49 which has a slope indicative of the system response characteristic. Since the output of the level detector circuit 27 will be beneath the level of the low set point reference signal 30, the integrating amplifier will continue to energize the summing amplifier 32 to call for additional pressure. As the liquid level approaches the low set point, the output of the level detector circuit 27 will approach the low set point reference signal 30 thereby decreasing the rate of change of the output of the integrating amplifier 28 and signalling the need for less pressure increase.

If, with the system in this condition, the liquid level rises above the low set point, the level detector circuit 27 will generate a signal greater than the low set point reference signal, the pressure generated by the converter will fall below that within the chamber 13 and the relief valve 35 will exhaust some of the gas within the chamber 13 to the atmosphere. Thus, the liquid level within the discharge spout 16 will be regulated about the low set point.

When it is desired to pour, the start pour circuit 39 is actuated; this energizes the pour signal 40 to generate a second step signal at the input of the summing amplifier 32 which immediately calls for an abrupt increase in pressure within the chamber 13. This is illustrated in FIG. 2 by the second segment of steep slope labeled "Pour Step Signal." Thus, the liquid level in the discharge spout 16 is abruptly increased from the low set point to a point adjacent the high set point 48 (FIG. 3). At the same time, the output signal of the start pour circuit 39 actuates the switch means 29 to couple the high set point reference signal 31 to the reference input of the integrating amplifier 28; and, similar to the operation of the system in regulating the liquid level about the low set point as previously described, the liquid level within the discharge spout 16 will be regulated about the high set point during the pour.

When the liquid level within the discharge spout 16 rises above the lip 20 of the weir 19, the output signal of the level detector circuit 27 will become greater than the output signal of the weir reference signal circuit 42, and the function generator 41 will begin generating an output signal. The function generator 41 generates an output signal which is a function of the difference between the input signal received from the level detector circuit 27 and the signal received from the weir reference signal circuit 42. The function generator 41 computes the flow rate of the liquid through the weir 19, and its particular structure depends upon the characteristic geometry of the weir.

As illustrated in FIG. 3, we prefer to use a rectangular weir for which the flow rate is a three-halves power function of the height of the liquid above the lip of the weir ($Q=Kh^{3/2}$). The function generator 41 generates an output voltage which is proportioned to the amount of voltage appearing at its signal input over that which appears at its reference input raised to the three-halves power. In other words, $V_{out}=K_1(V_{in})^{3/2}$ where $V_{in}$ is the difference between the signal at its signal input and that which appears at its reference input and $K_1$ is the weir proportionality constant. As long as the signal generated by the weir reference signal circuit 42 is greater than that which is generated by the level detector circuit 27, the function generator 41 will have a zero output signal. The function generator 41 is a conventional analog function generator and depends upon the geometry of the weir.

The voltage-to-frequency converter 43 is also a conventional circuit and it generates an instantaneous output frequency which is proportional to the amplitude of its input voltage (namely, that which is received from the function generator 41).

The present digital counter 44 is also of conventional design; and it stores as preset count and a running count for each cycle of frequency of the output signal of the converter 43. When the accumulated running count reaches the stored count, the counter 44 generates a stop pour signal which actuates the switch means 29 to switch back to its original state in which the output signal of the low set point reference signal 30 is fed to the reference input of the integrating amplifier 28. This will effect an abrupt reduction of pressure within the ladle (indicated by the negatively sloped line of FIG. 2); and the liquid level within the discharge spout 16 will fall and be regulated about the low set point.

This abrupt reduction in pressure is further promoted by action of the error amplifier 45 which responds faster than the integrating amplifier 28 in calling for a pressure decrease. Further, the relief valve 35 (as set forth in greater detail below) responds to the great disparity between the output of the current to pressure converter 33 and the actual pressure in the ladle by opening two separate valves, one relatively larger than the other, thereby abruptly terminating the pour.

Before describing the detailed circuit schematic, it will be noted that the electrical signal processing provided by our system is for all practical purposes instantaneous with no loss of stability so that the liquid level within the discharge spout 16 can be very closely and accurately controlled. Further, the heretofore troublesome variables of expanding, heated gases within the chamber of the ladle, the compressibility of the gas, and the large inertia of the liquid are overcome by the extremely fast response capabilities of the electronic control system together with the relief valve arrangement and the various compensating schemes. In addition, volume is measured directly, and due to the generally linear response characteristic of the electrical transducer in the level detector, it is measured more accurately.

As will be realized from the following description of the detailed circuit schematic, additional advantages are obtained in that the exact volume of the pour may be easily set; and the time of pour may be adjusted by simply adjusting the high set point reference signal.

DETAILED CIRCUIT SCHEMATIC

FIG. 4 illustrates a more detailed schematic of the system of FIG. 1 showing some of the circuitry and with those elements of the system commercially available shown again in functional block form. Turning then to FIG. 4, the level detector takes the form of a potentiometer 50 having its movable contact coupled to the mechanical float 25 by means of the arm which is schematically illustrated by the dashed line 51 in FIG. 4.

A reference power supply supplies power for the level detector 27, the weir reference signal circuit, 42, and both the high and low set point reference signals, 30 and 31. The supply itself is not shown in the drawing, but its positive terminal is represented by $+V_R$ and its negative terminal is represented by $-V_R$. The system is brought to a state of readiness by a "normal" relay 52 having normally open contacts 52a and 52b respectively connected in series with the positive and negative terminals of the reference power supply $V_R$. The fixed terminals of the potentiometer 50 are then connected between the contacts 52a and 52b. A similar potentiometer 53 having its fixed terminals connected respectively between the contacts 52a and 52b performs the function of the weir reference signal circuit 42, and its movable contact is connected to the reference input of the function generator 41.

Third and fourth potentiometers 54 and 55 also have their fixed terminals connected between the contacts 52a and 52b; and these potentiometers comprise respectively the low set point reference signal and the high set point reference signal, as will be more fully explained below.

A conventional operational amplifier 58 and a capacitor 59 coupled between the output lead and the signal input of the operational amplifier 58 constitute the integrating amplifier 28. The reference lead of the operational amplifier 58 is connected to a common terminal, as illustrated.

The movable contact of the potentiometer 50 is connected through a variable resistor 60 to the signal input of the operational amplifier 58. Although resistor 60 is shown schematically as a single variable resistor, persons skilled in the art will appreciate that it advantageously may be two variable resistors in series to provide coarse and fine control over the gain characteristics of the operational amplifier 58.

A pour relay 61 having a set of normally closed contacts 61a, a first set of normally open contacts 61b and a second set of normally open contacts 61c is deenergized by the output signal the preset digital counter 44.

The normally open contacts 61b are interposed between the movable contact of the potentiometer 55 and the system common; and the normally closed contacts 61a are interposed between the movable contact of the potentiometer 54 and the system common. Hence, the reference lead of the operational amplifier 58 will be connected (through the system common) either to the movable arm of the potentiometer 55 or the movable arm of the potentiometer 54 depending upon whether the relay 61 has been energized or not.

In summary, when the preset digital counter 44 generates its output pulse indicating that a predetermined volume of molten metal has flowed through the weir, it will de-energize the pour relay 61; and the reference input of the operational amplifier 58 will be referenced against the signal which appears on the movable contact of the potentiometer 54 (namely, the low set point signal). When the pour relay 61 is energized, contacts 61b will close, contacts 61a will open, and the reference input of the operational amplifier 58 will receive the output signal of the potentiometer 55 which is the high set point signal.

A second operational amplifier 62 has a feedback resistor 63 connected between its output and its signal input. The output of the operational amplifier 58 is connected through a resistor 64 to the signal input of the operational amplifier 62; and the reference input of the operational amplifier 62 is connected to the system common. The operational amplifier 62 and resistor 63 comprise the summing amplifier 32 as previously described.

A second power supply having its positive terminal represented by $+V$ in FIG. 4 is connected through normally open contacts 52c associated with relay 52 to a fixed terminal of a potentiometer 65. The other fixed terminal of the potentiometer 65 is connected to common, and it performs the function of the previously-described "pressurized ladle" circuit 37. A variable resistor 66 couples the signal on the movable contact of the potentiometer 65 through a fixed resistor 67 to the signal input of the operational amplifier 62. Normally open contacts 61c associated with the pour relay 61 are connected in parallel with the variable resistor 66.

The previously-described error amplifier 45 takes the form of an operational amplifier 68 having a fixed resistor 69 connected between its output terminal and its signal input lead. The signal lead of the operational amplifier 68 is coupled to the movable contact of the potentiometer 50 through a resistor 70; and the reference input of the operational amplifier 68 is connected to common. The output terminal of the operational amplifier 68 is coupled through a series diode 71 and variable resistor 72 to the signal input of the operational amplifier 62 as shown. The output terminal of the operational amplifier 68 is also coupled to ground through a diode 73 and a current-limiting resistor as shown.

The previously-described pressure converter 33 comprises a power amplifier 74 and power relay 75. The power amplifier 74 receives the output signal of the operational amplifier 62 and drives a conventional power relay 75 which generates a pneumatic pressure proportional to its input current.

Cascaded valves 76 and 77 are connected between the source of pressurized air 36 and the ladle dome for regulation. Each of the valves 76 and 77 has a diaphragm (schematically illustrated by the solid horizontal line 76′ in valve 76) to which there is coupled a valving mechanism for establishing the main flow of pressurized air responsive to the pressure above the diaphragm being greater than the pressure beneath the diaphragm. As shown in FIG. 4, the pressure output of the power relay 75 is coupled to the valves 76 and 77 above their respective diaphragms, and the main supply line is connected as a reference beneath their respective diaphragms. Each of the valves 76 and 77 are normally closed so that when the power relay 75 generates a pressure greater than the respective output pressures of the valve 76 and 77, these supply valves will open thereby admitting pressurized air into the ladle dome. The valves 76 and 77 are cascaded in order to provide a sufficient pressure drop between the source and ladle to achieve good regulation.

The previously-described relief valve 35 takes the form of two separate valves 78 and 79 similar to the valves 76 and 77. The pressure output of the power relay 75 is coupled beneath the diaphragm of the valves 78 and 79 as a reference; and the dome pressure is connected above the diaphragms of the valves 78 and 79 as illustrated. Hence, when the dome pressure becomes greater than the pressure generated by the power relay 75, the valves 78 and 79 will open to exhaust air or gas within the dome to the atmosphere. Preferably, one of the valves 78 or 79, for example 79, is set to respond to a slightly higher pressure than the other one but its main body size is relatively larger so that in an alarm condition or in terminating a pour wherein differential is great, the second valve would act to provide faster relief. This feature is also important in its cooperation with the error amplifier to rapidly terminate a pour thus providing greater accuracy and repeatability of results. Improved results have been obtained when the valves are of the modulating type, that is, the size of the exhaust aperture is modulated by the pressure differential across the diaphragm.

Although the specific circuit elements may be replaced with various well-known equivalent structures, we have found certain of these elements to offer significant advantages to system response. In this connection, the combination of operational amplifier 58 and its associated feedback capacitor 59 to provide an integrating amplifier having a rate of change of output voltage proportional to the difference between the voltage at its signal input and that at its reference input is particularly useful. That is to say, what is desired is a pressure rate of change proportional to the difference between the actual height and the desired height of the liquid in the discharge spout. The variable resistor at the signal input of the integrating amplifier which couples the liquid level signal is also advantageous in permitting the independent setting of the system gain.

Further, the potentiometer 53 provides a convenient means for adjusting the weir reference signal, that is, the reference signal above which the function generator 41 operates. The pour volume can easily be set by adjusting the count at which the preset digital counter 44 acts to de-energize the pour relay 61. The pouring rate (that is fixed by the height of the liquid above the weir) may be varied by adjustment of potentiometer 55.

The operation of the system at the block diagram level has already been described and the circuit operation description will therefore be brief. The "normal" relay 52 is energized and through its contacts 52a and 52b, the reference voltage supply $V_R$ is connected across the fixed terminals of the potentiometers 50, 53, 54 and 55. At the same time, power is coupled to the potentiometer 65 through contacts 52c, and a step function of voltage of predetermined amplitude is supplied to the signal input of the operational amplifier 62 from the movable contact of the potentiometer 65. Thus, a step current will be amplified in the power amplifier 74 and a step increase in pressure will be generated by the relay 75 to bring the liquid level within the discharge spout 16 near the low set point. This is illustrated in FIG. 2, as the L.S.P. signal. Since the pour relay is de-energized at this time, its normally closed contacts 61a will couple the output signal of the potentiometer 54 to the reference lead of the operational amplifier 58, and the system will seek to regulate the liquid level about the low set point. Hence, in FIG. 2, the liquid level rises to the low set point along the line 49 which has a much less slope than the "L.S.P. Step Function."

When the pour relay 61 is energized, normally closed contacts 61a open and the normally open contacts 61b close so that the reference input of the operational amplifier 58 now receives the higher signal from the potentiometer 55 and the system will adjust itself to regulate about the high set point. It will also be noted that when the pour relay 61 is energized, it resets the digital counter 44 and it also shorts out the variable resistor 66 by closing contacts 61c. This latter feature provides an additional surge of current in the electrical portion of the control system to generate an additional surge of pressure within the dome thereby rapidly bringing the liquid in the discharge spout up to a point just beneath the high set point (see FIG. 2). The high set point will be reached according to the response characteristic of the system. When the digital counter 44 has reached its preset count indicating the pouring of a predetermined volume of molten metal, it generates a signal which de-energizes the pour relay 61 and the normally open contacts 61b are then opened, and the normally closed contacts 61a are closed so that the reference signal into the operational amplifier 58 is the lower signal.

At the same time, since contacts 61a are now closed, the reference input to the error amplifier (i.e. operational amplifier 68) is also the low set point which is coupled through the system common to its reference input. As already mentioned, the error amplifier is considered an important aspect of the invention for abruptly reducing the liquid level. This is accomplished because the error amplifier is adjusted to a greater gain than the integrating amplifier, and its response time is much faster. The capacitor 59 will usually be relatively large and it must discharge before the integrating amplifier can respond. The error amplifier, on the other hand, has no inherent delay so that it acts to abruptly terminate the pour, as seen by the negatively sloped line in FIG. 2. The liquid level then recovers to the low set point under normal system operation.

The diode 71 in series with the output of the error amplifier serves as a blocking diode so that unless the liquid level is very much greater (in relation to acceptable variations) than the set point reference signal then operative, the error amplifier has negligible effect on system operation. Further, the diode 73 and its limiting resistor shunting the output of the error amplifier to ground insure that the error amplifier has no effect at all in the case where the liquid level may be very much *less* than the set point reference signal then operative. In this latter situation the low and high set point step generators are effective.

Additional advantages in abruptly terminating a pour, as already explained in detail, is the arrangement of the relief valves 78 and 79 which would both open at this time to reduce pressure in the chamber.

SUMMARY OF SYSTEM FEATURES

The advantages of the individual circuit elements, have already been explained, and a summary of the major systems features is set forth below:

(1) The low Set Point Step Signal and the Pour (or High Set Point) Step Signal are independent of and do not affect the stability of the system response. They are introduced into the control loop after the integrating amplifier, and, hence, it is isolated from them. Either the system response characteristic (i.e. gain of the integrating amplifier) or the amplitude of the step signals may be separately adjusted without interplay. This arrangement obviates the problem of prior systems which encountered an oscillation of liquid level at the shorter cycle times. A decrease in the cycle times for the inventive system over prior pneumatic systems of up to a magnitude of five to one has been realized.

(2) A pour may be terminated in a very short time by means of the error amplifier which overrides the integrating amplifier in this situation together with the advantageous arrangement of two parallel relief valves of the modulating type having different body sizes and responses at different pressures.

(3) The flow rate of a pour is measured directly for the particular weir in use, and the integrated flow rate is determinative of the volume of a pour. When a predetermined volume is reached, the system automatically responds to abruptly terminate the pour.

(4) The Low Set Point Step Signal rapidly brings the system to a state of readiness without introducing an instability in the control.

(5) The instantaneous response of the electronic portion of the control system does not counteract with the pneumatic controls to produce instability.

Having thus described in detail a preferred embodiment of our invention, it will be obvious to persons skilled in the art that many of the individual circuit elements as well as the pneumatic system may be modified and that fluid, as distinguished from electrical, network elements (e.g. amplifiers, integrators and logic devices) will work with like results. It is therefore intended that all such equivalents and substitutions be covered as they are embraced within the spirit and scope of the appended claims.

What is claimed is:

1. A system for pouring predetermined amounts of liquid by measured volume, comprising: a container defining an interior chamber for receiving said liquid and a discharge spout including a lip over which said liquid flows durng a pour, pressure means communicating with said chamber for introducing gas under pressure therein for forcing said liquid through said discharge spout, level detecting means associated with said liquid for generating an electrical signal representative of the level of said liquid in said spout, reference circuit means for generating a first electrical reference signal representative of a liquid level in said discharge spout below said lip and a second electrical reference signal representative of a liquid level in said discharge spout above said lip, switch means receiving said first and second electrical reference signals for selectively transmitting one of them, means receiving said liquid level signal and the selected signal from said switch means for controlling said pressure means to adjust the liquid level in said spout until said liquid level signal is equal to said selected reference signal, first means for controlling said switch means to transmit said second reference signal when it is desired to pour, signal means for adding additional signal to said second reference signal transmitted from said switching means in response to the start of a pour thereby to abruptly move the liquid level in said spout to a level above said lip, and second means receiving said liquid level signal for controlling said switching means to transmit said first reference signal when said pour reaches a predetermined volume.

2. The system of claim 1 wherein said second means for controlling said switching means comprise means receiving said liquid level signal for generating a signal representative of the flow rate of said liquid over said lip, means receiving said flow rate signal during a pour for generating an accumulated signal representative of the volume of said pour, and means coupled to said accumulated signal for switching said switching means to transmit said first reference signal in response to said accumulated volume signal reaching a predetermined signal value whereby said pressure control means will thence adjust the liquid level in said spout to a level beneath said lip to terminate the pour.

3. The system of claim 2 wherein said means for generating said flow rate signal is a function generator and wherein said signal accumulating means comprises a voltage-to-frequency converter receiving the output signal of said function generator for generating a signal having a frequency representative of the amplitude of said function generator signal, and preset digital summing means for recording a count for each cycle of output frequency from said voltage-to-frequency converter, said summing means thereby storing said accumulated volume signal and generating an output signal for controlling said switching means when a predetermined count is attained.

4. The system of claim 3 further comprising means associated with said first means controlling said switching means for resetting said summing means when a pour is initiated.

5. The structure of claim 1 wherein said means for controlling said pressure includes an integrating amplifier receiving said liquid level signal and the output signal of said switch means for generating an output signal having a rate of change which is a function of the difference between said received signals, and signal-to-pressure converter means coupled to the output of said integrating amplifier for generating a pressure signal representative of the output signal thereof for controlling said pressure means.

6. The system of claim 5 further comprising circuit means including an error amplifier adapted to override the operation of said integrating amplifier when the liquid level signal is greater than the reference signal from said switching means output for transmitting an abrupt signal to said pressure control means to decrease the pressure in said chamber.

7. The system of claim 6 further comprising summing means receiving the output of said integrating amplifier for energizing said signal-to-pressure converter, and wherein said signal means for adding additional signal in response to the start of a pour comprises step signal generator means coupled to an input of said summing means for abruptly changing the input signal thereof.

8. The system of claim 6 further comprising circuit means for selectively introducing a second abrupt signal at an input of said summing means at start-up thereby rapidly increasing the pressure input signal to said signal-to-pressure converter for bringing the liquid in said spout rapidly to the said level below said lip.

9. The system of claim 8 wherein said reference means for generating said first reference signal is independently settable for adjusting the level of said liquid below said spout whereby said system will accommodate the addition of large amounts of liquid in said chamber.

10. The system of claim 8 wherein said reference means for generating said second reference signal is independently settable for adjusting the level of said liquid above said spout whereby the rate of flow of said liquid during a pour may be set.

11. The system of claim 1 wherein said pressure means includes a first modulating relief valve adapted to exhaust gas from said chamber when the pressure therein is greater than the pressure signalled by said control means and a second modulating relief valve having a larger body size than first valve and adapted to exhaust gas from said chamber when the pressure therein exceeds the pressure signalled by said control means by a predetermined amount.

12. A system for pouring a predetermined volume of a liquid comprising: a discharge spout communicating with a supply of the liquid, said spout defining a lip over which said liquid flows during a pour; means for adjusting the level of the liquid in the spout; function generator means associated with said liquid for generating a signal representative of the rate of flow of said liquid over said lip during a pour; summing means receiving said signal for accumulating a signal representative of the volume of a pour; and control means for controlling said adjusting means to terminate the pour in response to the accumulated signal of said summing means reaching a predetermined value.

13. A structure of claim 12 wherein said level adjusting means comprises transducer means associated with said liquid for generating an electrical signal representative of the level of said liquid in said spout; means including integrating means for generating a signal having a rate of change which is a function of the difference between said level signal and a reference signal, said reference selectively being one of a first signal representative of a level in said spout below said lip and a second signal representative of a level in said spout above said lip; and means receiving the output signal of said integrating means for energizing said control means.

14. A method of pouring a predetermined amount of liquid from a sealed container provided with a spout comprising: abruptly displacing the liquid in the container with pressurized gas to force the liquid through the spout to start a pour, generating a signal which is a function of the flow rate of said pour, summing said rate signal over time, and reducing the gas pressure on the liquid when the accumulated signal records a predetermined value to terminate the pour.

References Cited

UNITED STATES PATENTS

| | | | |
|---|---|---|---|
| 2,937,789 | 5/1960 | Tama | 222—70 X |
| 3,058,180 | 10/1962 | Port et al. | 164—156 |
| 3,235,922 | 2/1966 | Kaji | 222—70 X |
| 3,252,187 | 5/1966 | Burkett | 222—70 |
| 3,385,473 | 5/1968 | Forcesi | 222—394 |

SAMUEL F. COLEMAN, Primary Examiner

U.S. Cl. X.R.

222—394